Oct. 24, 1967

A. VUARCHEX 3,348,747

SKI CARRIER

Filed Feb. 25, 1966

INVENTOR:
ALEXANDRE VUARCHEX
BY E. M. Squire
HIS ATTY.

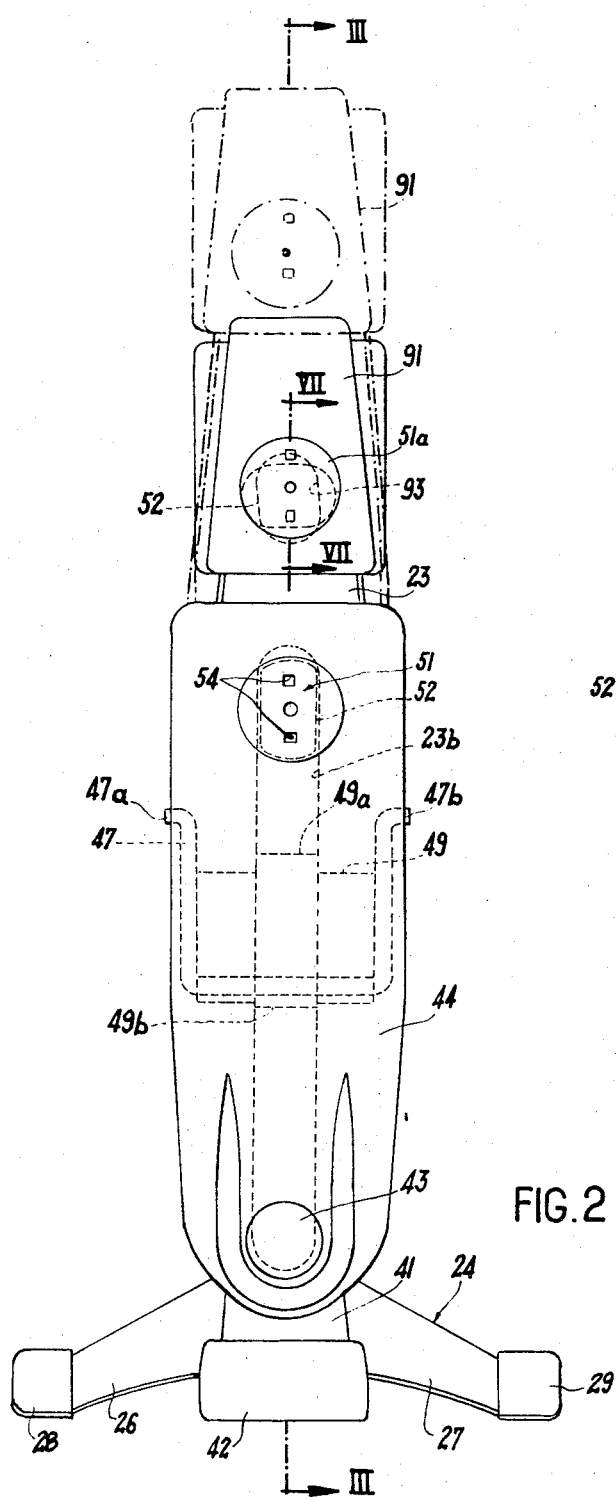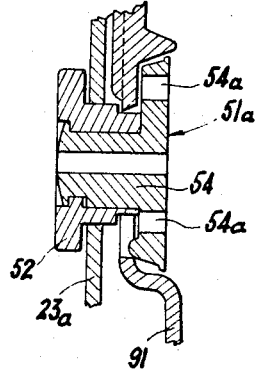

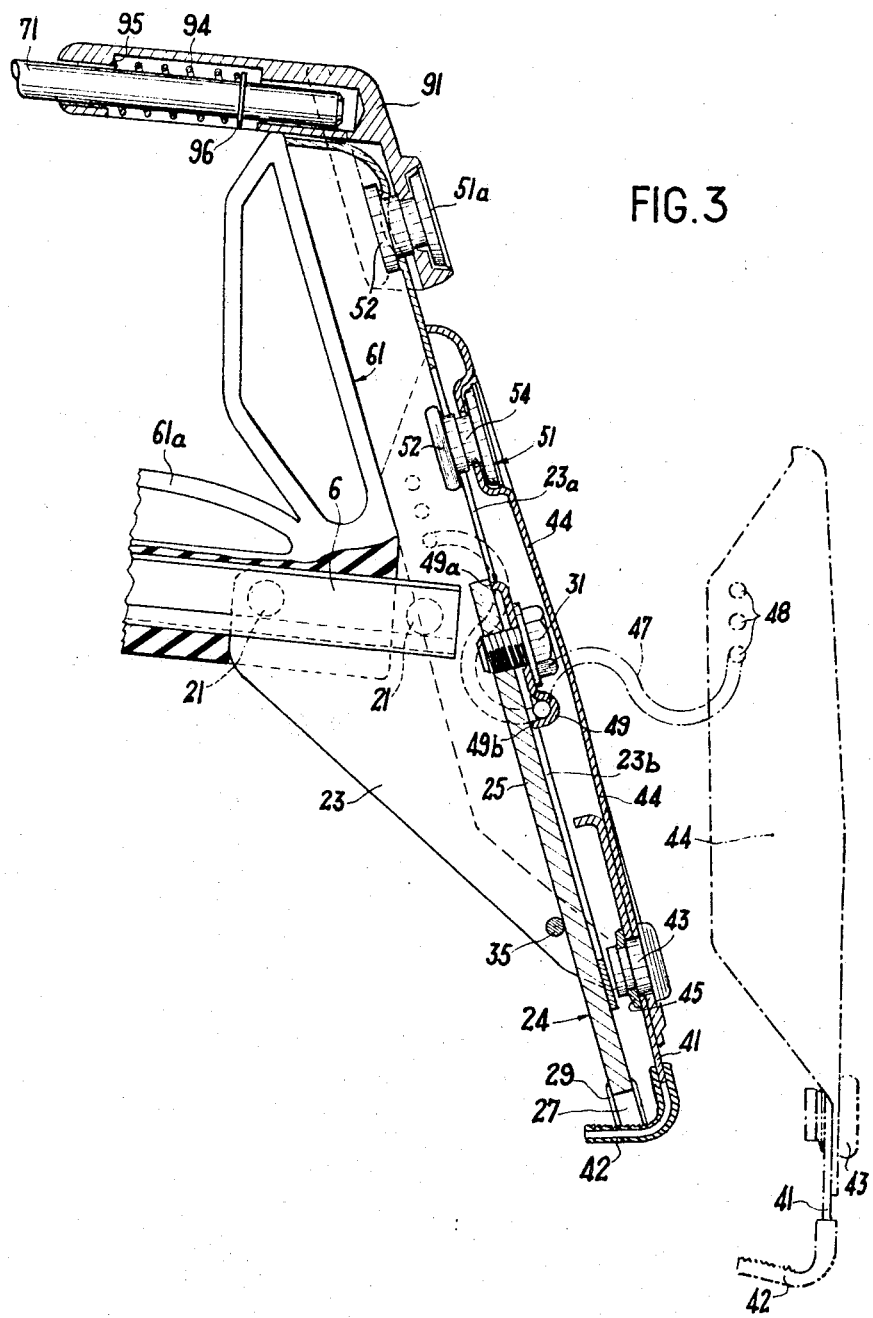

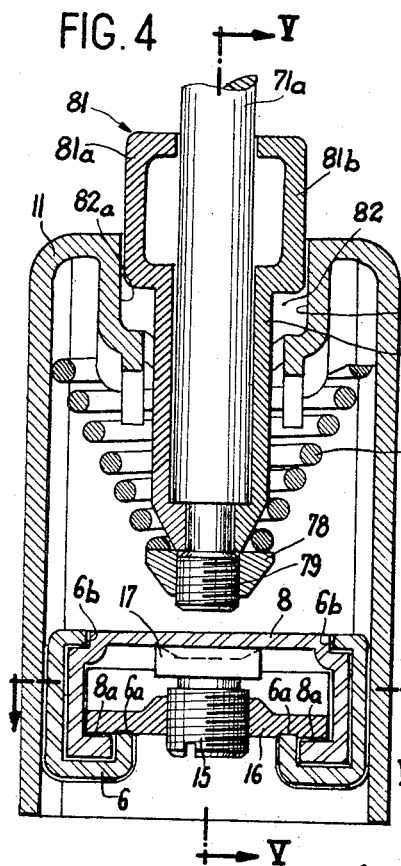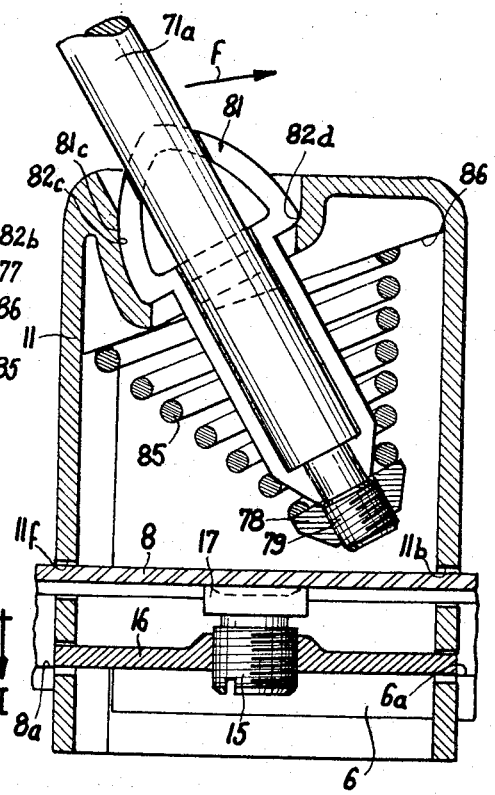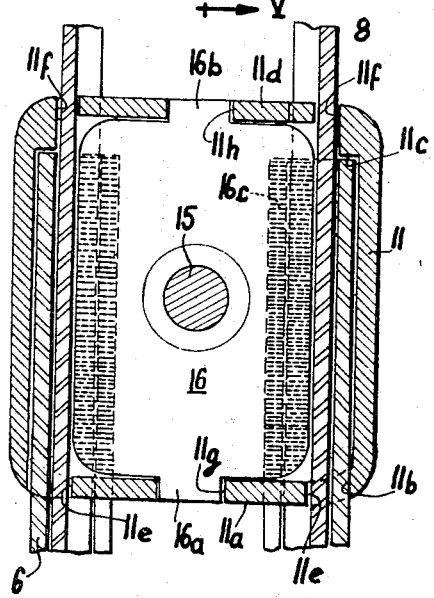

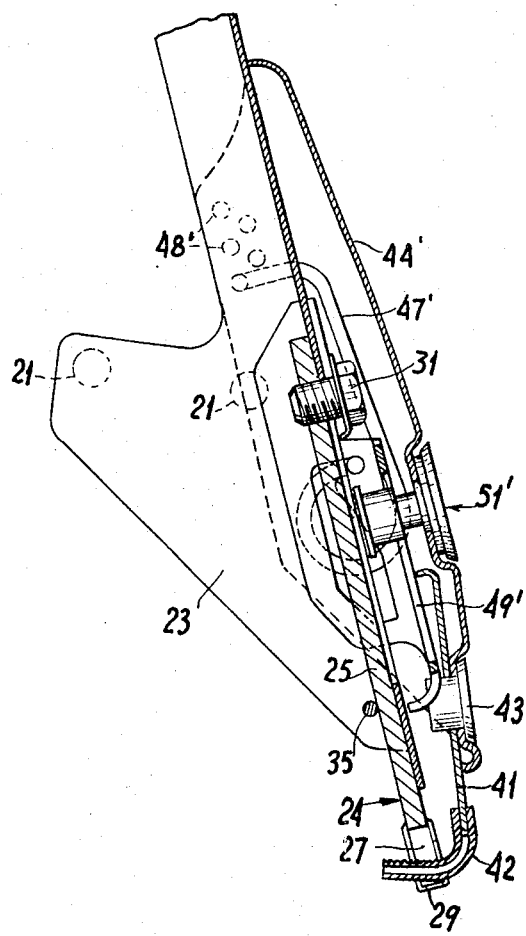

United States Patent Office 3,348,747
Patented Oct. 24, 1967

3,348,747
SKI CARRIER
Alexandre Vuarchex, Annemasse, France, assignor to DAV, Annemasse, France, a body corporate of France
Filed Feb. 25, 1966, Ser. No. 529,997
10 Claims. (Cl. 224—42.1)

The present invention relates to ski carriers of the type comprising two transverse members arranged to extend over the roof of an automobile.

The invention provides a ski carrier of this type which is especially convenient to use, not only for its ready positioning on and removal from the vehicle, but also for the convenient positioning and removal of the skis and ski poles, which, additionally assures a very secure holding of the skis and poles and which is at the same time of a pleasing appearance.

For this purpose, in accordance with a first aspect of the invention, each end of each transverse member is provided with a lateral support which comprises a foot arranged to engage in the bottom of the corresponding gutter which extends along the roof of the automobile and which is provided with a toggle-actuated retaining hook engaging beneath the gutter. The transverse members carry interchangeable ski and pole-holding blocks formed of a material having appropriate pliability and resiliency, such as hard rubber, each slotted at the upper side to receive the skis and ski poles. Retaining levers are provided for securing the skis and poles and each is pivoted, at one of its ends, above one of the transverse members in proximity to the central portion thereof and each is provided at its other ends with means for locking it to the corresponding lateral support.

Because of this particular structural arrangement, the positioning of each transverse member on the roof of the automobile and its removal may be effected instantly, the positioning of the supporting blocks for the skis and poles near the edges of the roof of the automobile make the loading and unloading very convenient, the interchangeability of the supporting blocks permits readily modifying their number and arrangement, and accidental bending of the transverse members involves no risk of damaging the roof of the automobile because contact is between the roof and lower surfaces of the supporting blocks which are made of rubber.

In accordance with another aspect of the invention, the ski carrier is arranged for convenient adjustment to fit the grooves of the gutters of all automobiles, regardless of their widths or their curvatures both in the transverse and longitudinal directions. For this purpose, the transverse members are extendable, the supporting feet are of adjustable height and, additionally, the feet and the retaining hooks may be adjustably oriented with respect to substantially parallel transverse axes which permits levelling of the transverse members notwithstanding possible inclination of the gutters toward the front or toward the rear at the mounting positions of the supporting feet of the transverse members.

Additionally, the locking arrangement for holding the retaining levers for the skis and poles and the arrangement for locking the retaining hooks which secure the transverse members to the roof of the automobile are so constructed as to constitute an effective anti-theft protection for the skis and the ski carrier, respectively.

The invention will be more fully understood by reading the following specification with a reference to the accompanying drawing forming a part hereof:

Referring to the drawing:

FIGURE 2 is an enlarged side elevational view showing a lateral support for a transverse member.

FIGURE 3 is a transverse sectional view taken along the line III—III of FIG. 2.

FIGURE 4 is an enlarged sectional view in side elevation taken along the line IV—IV of FIG. 1.

FIGURE 5 is a sectional view in elevation taken along the line V—V of FIG. 4.

FIGURE 6 is a plan sectional view taken along the line VI—VI of FIG. 4.

FIGURE 7 is an enlarged fragmentary sectional view taken along the line VII—VII of FIG. 2; and FIGURE 8 is similar to FIG. 3 illustrating a modified embodiment of the invention.

Figure 1:
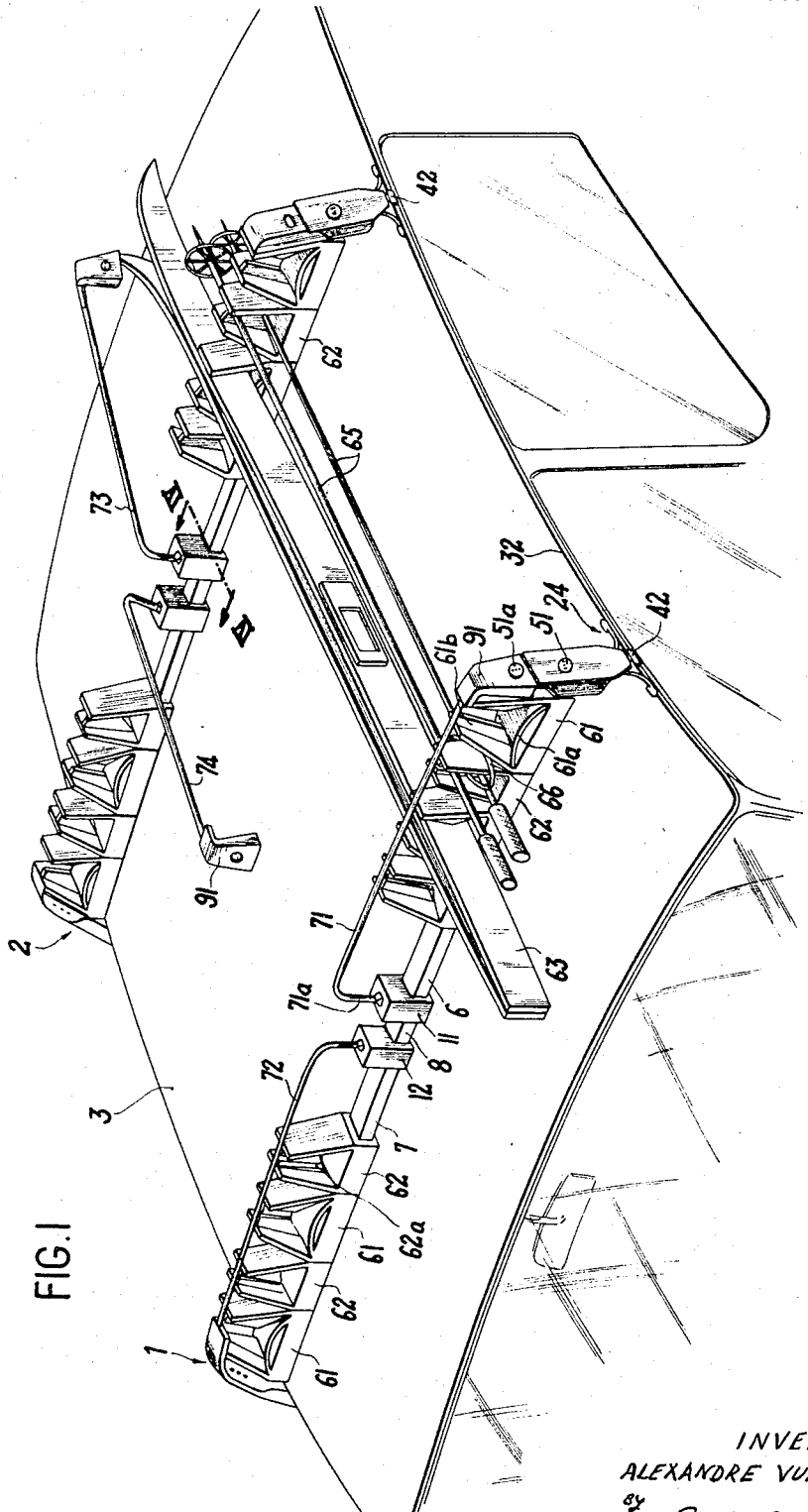
FIGURE 1 is a perspective view of a ski carrier embodying the invention mounted on the roof of an automobile.

A complete ski carrier on the roof of an automobile as shown in FIG. 1 consists essentially of a pair of identical transverse members designated generally as 1 and 2 and arranged to be fixed to the roof 3 of an automobile extending transversely thereover.

Since the transverse members 1 and 2 are identical only one of them will be described in detail, namely the transverse member 1. It consists essentially of two lateral slide members 6 and 7 (see also FIGS. 3 through 6) of which the edge portions is proximity to the ends are turned inwardly as shown at 6b (FIG. 4) and which are arranged to slide over a central slide member 8. The two lateral slide members 6 and 7 and a central slide member 8 have transverse sectional configurations which are generally U-shaped and which are complementary, one being slidably enclosed within the other as may be clearly seen in FIG. 4. The ends of the side walls of these sections are conveniently curved in such a manner that the assembly of the three slide members 6, 7, 8 forms a telescopic transverse member the length of which is adjustable in accordance with the width of the roof 3 of the automobile on which the ski carrier is mounted.

The inner end of each of the two lateral slide members 6 and 7 is enclosed within a housing 11 or 12, respectively. It extends only through one of the walls of the housing. Thus, the internal end of the slide member 6 passes through the wall 11a of the housing 11 (FIG. 6) through an aperture 11b of suitable shape, the end surface of the slide member abutting in internal shoulder 11c located in proximity to the wall 11d of the housing opposite its wall 11a.

On the other hand, the central slide member 8 which slides within the two lateral slide members 6 and 7 extends completely through the housing 11 through both of its walls 11a and 11d passing slidably through corresponding apertures 11e and 11f. The inner end of each of the lateral slide members 6 and 7 is fixedly positioned with respect to the central slide member 8 within the corresponding housing 11 or 12 by means of a locking system constituted by a screw 15 and a plate 16. The screw 15 is held, by its threaded portion, in a corresponding central tapped hole in a plate 16 and its end, in the form of a dish 17 with sharp edges, is pressed against the internal surface of the central slide member 8. The plate 16, which is of generally rectangular shape, has two edges which extend along the internal surfaces of the lateral walls of the central slide member 8 and two other surfaces located against the internal surfaces of the walls 11a and 11d of the housing 11. The plate 16 includes, additionally, two tongues 16a and 16b engaging respectively in windows 11g and 11h formed in the two walls 11a and 11d, respectively, of the housing 11, in such a manner that the plate is centrally positioned within the interior of the housing so as to avoid rubbing or the possibility of interference with the internal surfaces of the lateral walls of the central slide member 8 during adjustment of the length of the assembly.

Upon tightening the screw 15 its dished end 17 digs into the internal surface of the upper wall of the central slide member 8, bearing, by means of the plate 16, on the one hand against the upper surface 8a of the re-entrant end of each of the sides of the central slide member 8, and on the other hand against the upturned edges 6a of the two side portions of the lateral slide member 6. In order to enhance the engagement of the plate 16 with the surfaces 6a and 8a of the slide members the corresponding marginal portions of its lower surface are serrated or knurled as indicated at 16 in FIG. 6.

The interior of the housing 12 (FIG. 1) is arranged in the same manner as the interior of the housing 11 in such a manner as to permit locking of the other lateral slide member 7 to the central slide member 8.

The outer end of each of the two lateral slide members 6 and 7, for example, slide member 6, is fixedly connected by rivets 21 (FIG. 3) to the corresponding side walls of a lateral support 23 of U-shaped horizontal cross-sectional configuration. The lateral support 23 is carried by a foot 24 (see also FIGS. 1 and 2) constituted by a plate comprising an elongated portion 25 which extends in a generally upwardly and downwardly direction against the internal face of the central portion 23a of the lateral support 23 and of which the lower portion is bifurcated to form two branches 26, 27 the ends of which are covered by two protective tip members 28, 29 respectively, formed of suitable plastic material.

The foot 24 is secured to the support 23 by a screw 31 of which the threaded portion is engaged in a tapped hole formed in the upwardly elongated portion 25 of the foot and which passes freely through a longitudinal slot 23b in the central portion 23a of the lateral supporting member in such a manner that it is possible to lower the foot 24 more or less with respect to the lateral support 23 in order to adjust the height of the transverse members with respect to the roof 3 of the automobile, when the two branches 26, 27 of the foot are placed in the gutter 32 (FIG. 1) of the roof of the automobile.

By tightening the screw 31, the foot 24 becomes fixed with respect to the corresponding lateral support 23.

Moreover, the width of the upwardly elongated portion 25 of the foot is smaller than the width of the lateral support 23 and, accordingly, the entire assembly 1 of the carrier may be pivoted about the axis of the screw 31 with respect to the foot 24 the forked portion of which, including the ends of its two arms 26 and 27, is positioned in the bottom of the corresponding gutter, which permits the ski carrier member 1 to be levelled regardless of the local slope of the roof gutter of the automobile at the position of the supporting foot 24. A horizontally extending guide rod 35 (FIG. 3), riveted to the two flanges of the lateral support 23, in proximity to the lower portions thereof, slidingly retains the foot 24 against the internal surface of the central portion 23a of the lateral support 23.

Each foot, such as 24, is maintained applied against the bottom of the corresponding gutter by a system which comprises a hook 41 the end portion of which is enclosed by plastic material 42 and which is held by a pivot member 43 against the lower portion of a cover member 44 of U-shaped horizontal cross-sectional configuration like the lateral support 23, and which is arranged to enclose the lateral support 23.

Pivot 43 is in the form of a rivet provided with a spring washer 45 which assures a resilient locking of the hook 44 against the cover member.

Cover member 44 is connected to the lateral support 23 by a toggle system constituted by a toggle member 47 (see FIGS. 2 and 3) which is generally U-shaped and of which the laterally extending end portions 47a, 47b are each engaged in one of the series of several (3 as shown in the drawing) holes 48 formed in the lateral wall of the cover member 44, for the purpose of adjustment in accordance with the thickness of the gutter which is to support the ski carrier, the central portion of the toggle member being pivotally mounted on a horizontal geometric axis in a retaining member 49 which is secured against the external surface of the central portion 23a of the support 23 by the same screw 31 which secures the support 23 to the foot 24. Two tongues 49a, 49b of the retaining member 49 are engaged in the slot 23b of the supporting member 23. The two lateral arms of the toggle member 47 are each S-shaped which provides a certain resiliency appropriate for assuring proper hooking of the lateral support to the gutter. The toggle member 47 is additionally frictionally held, on one hand, by the retaining member 49, and on the other hand, by the edges of the holes 48 of cover member 44, by its lateral resiliency, which permits the cover member to be frictionally retained in its disengaged position shown in broken lines in FIG. 3. This facilitates positioning the ski carrier on the roof of the automobile as well as its removal therefrom.

The hook 41 is arranged to engage beneath the gutter as shown in FIG. 3 in full lines, the disengaged position being shown in interrupted lines, as noted above.

An anti-theft arrangement is provided for holding the support 23 on the gutter and consists, as shown in the drawing, of a revoluble bolt 51 which comprises a cross member 52 of oblong shape (FIGS. 2 and 3) fixed to a shank 54 revolubly mounted in the upper portion of the cover member 44, in register with the slot 23b of the lateral support 23, the cross member 52 being substantially of the same width as the slot 23b, but of a length greater than the width of the slot 23b in such a manner that, when it is angularly positioned so that it is elongated in the direction of the slot, it may enter freely in the slot or be removed therefrom permitting the cover member 44 to be moved between the two positions shown in FIG. 3. On the other hand, when the cross member 52 occupies an angular position wherein it extends transversely of the slot, it holds the cover member 44 locked to the support 23. The rotatable bolt 51, formed for example of suitable plastic material, is mounted in cover member 44, with a large amount of friction, in such a manner that it cannot be turned except with a special key having projections arranged to enter corresponding apertures, such as 54, according to any desired security arrangement with respect to number, shape and arrangement of the apertures 54. In FIG. 7 there is shown, in section, an identical bolt 51a illustrated in a position rotated through 90° with respect to the bolt 51 and mounted in a different portion of the ski carrier as will be hereinafter described.

There are longitudinally movably threaded on the two supports transverse members 1 and 2, on the one hand, supporting blocks for skis such as 61 (FIG. 1) and, on the other hand, supporting blocks for ski poles such as 62 all formed of material having a certain degree of pliability and resilience, for example hard rubber. Each of these blocks comprises a base portion mounted on one of the corresponding laterial slide members 6, 7, the base being extended upwardly in two arms in such a manner that the entire block presents a recess between the arms within which the skis or the ski poles may be positioned.

Each ski supporting block 61 comprises a lower wall 61a in the form of an arch (also see FIG. 3) and two vertical upstanding walls 61b preferably obliquely inclined toward each other in such a manner as to assure the retention of a pair of skis inserted flat, one against the other, between the upwardly convergently inclined walls 61b of a block 61 mounted on the transverse member 1 and of an identical block mounted on the transverse member 2, as shown in FIG. 1.

Each pole supporting block 62 similarly comprises two confronting vertical walls 62a likewise upwardly convergently arranged in oblique vertical planes, in such a manner as to bear against a pair of ski poles such as 65 inserted in a supporting block 62 of transverse member 1 and in a block 62 of transverse member 2, the lanyard or wrist loop 66 of each pole being positioned to surround one of the upstanding arms 62a of the block 62 in such a manner as to hold the poles positively against longitudinal displacement.

The skis and the ski poles are prevented from escaping upwardly from the retaining blocks by means of retaining levers 71, 72 mounted on transverse member 1 and 73, 74 mounted on transverse member 2. The four levers are identical so that only one of them will be described. Referring to lever 71, it has a rectangularly bent end 71a mounted for pivotal movement in a sleeve 77 and held against axial movement by a nut 78 mounted on the reduced diameter end 79 which is threaded for this purpose.

The upper portion of the sleeve 77 is provided with a head 81 disposed in a recess 82 formed in the upper portion of the housing 11 and which has two parallel faces 82a, 82b against which the corresponding faces 81a, 81b of the head 81 are slidably engaged, these surfaces being vertical surfaces parallel to the longitudinal axes of the supporting members 1 and 2.

One of the other surfaces of the cavity 82 is shaped as a cylindrical surface, as shown at 82c in FIG. 5, and the axis of which is located on the opposite surface at the point designated 82d. Head 81 is provided with a complementary convex surface 81c which engages the concave surface 82c of the cavity in such a manner that the end 71a of the retaining lever in the sleeve 77, within which it is mounted, pivots in a vertical plane passing through the longitudinal axis of the supporting member 1 about the point 82d, in the direction of the arrow f, from the position shown in FIG. 5 to a substantially vertical position as shown in FIG. 1.

A conical helical compression spring 85 has its smaller and lower end bearing against the nut 78 and its larger upper end bearing against the interior shoulder 86 of housing 11 in such a manner as to yieldingly urge the end 71a of the retaining lever toward an inclined open position as shown for example for the lever 73 in FIG. 1. If the lever 73 is lowered, for instance by opposing the yielding action of its conical spring 85, the retaining lever 71 may be brought to its horizontal closed position. When the retaining lever 71 is raised, one may conveniently position or remove the skis or ski rods, this operation being facilitated by the fact that it's possible to arrange the retaining levers in a direction perpendicular to each transverse member as shown in FIG. 1 for the lever 74 by simply pivoting the lever in the corresponding sleeve 77. The frictional resistance to this pivotal movement is adjustable at will by the tightening of the nut 78.

Closure and holding of each closure lever such as 71 is provided by a rotary bolt member 51a (FIGS. 1, 2 and 7) the structure of which is identical with that of the bolt member 51 of the cover member 44 described above, the bolt member 51a being mounted in a handle 91 carried by the free end of the locking lever 71, the oblong locking member 52 cooperating with an opening 93 of corresponding shape (FIG. 2) formed in the upper portion of the cooperating lateral support 23.

The handle 91 is arranged to slide through a short distance along the free end of lever 71 and is subjected to the action of a helical retractile spring 94 one end of which bears against the shoulder 95 of the handle 91 and the other end against a snap ring 96 located in an annular groove formed in the lever 71. The spring 93 tends to press the inner surface of the handle 91 against the lateral support 23.

Ski racks for automobiles which have been described above have numerous advantages, because of the adjustability after loosening the concealed screws 15 (FIGS. 4 and 6), the length of the transverse members 1 and 2 may be adjusted to fit the widths of the roofs of all automobiles.

It is conveniently possible, after loosening the concealed screws 31 (FIG. 3) to adjust the height of the transverse members in a simple manner, to reduce to a minimum the space between the transverse ski carrier members 1 and 2 and the roof of the automobile whether the roof be flat or arched. In the drawings, the height adjustment range is shown in full lines for its minimum height and in broken lines in FIG. 2 for its maximum height.

Because of the pivotal movement of the feet 24 about the screws 31 (FIG. 3), it is possible to level each support 1 and 2 which improves the asthetic appearance of the carrier and assures a better engagement with the skis and ski poles.

In case of accidental contact with the roof caused by flexure of either transverse member, the roof is not damaged because the contact takes place with blocks of material which are both pliable and resilient.

The installation and removal of the ski carrier may be made very quickly, because the assembly is simply positioned in the gutter of the roof of the automobile and held in place by hooks carried by the covers 44 each of which is controlled by a resilient toggle mechanism.

The carrier may be mounted on gutters of any thickness by selecting the appropriate holes 48 (FIG. 3) for reception of the ends of the toggle members 47.

The bolt 51a of each retaining lever constitutes an anti-theft device for the skis and the ski poles and the bolts 51 an anti-theft device for the complete assembly on the top of the automobile.

The skis are conveniently held against lateral movement by the deformable arms of the rubber blocks 61 and against vertical movement by the arched bottoms 61a which are likewise deformable.

The ski poles are held against lateral and vertical displacement by the deformable walls 62a of the blocks 62 which support them and against longitudinal movements by the lanyards or wrist loops 66 in a positive manner.

It is possible quickly to change the number and arrangement of the ski carrying blocks and the pole carrying blocks which are removably mounted on the transverse members. Thus, for example, there may be provided a total of six ski carrier blocks and six pole carrier blocks, or else, as a variation, eight ski carrier blocks and two pole carrier blocks.

It is possible to place the ski carrier and pole carrier blocks as close as practicable to the edge of the automobile, that is at locations which are the most easily readily accessible.

The facility of opening and closing the retaining levers and the possibility to swing them out of the way longitudinally as explained above is shown at 74 in FIG. 1.

The arrangement avoids all risk of blockage of the mechanism as a result of humidity or freezing temperatures.

The assembly is protected against corrosion by use of an appropriate material such as an aluminum alloy or stainless steel or protected by cadmium plating or by the utilization of appropriate plastic materials wherever useful or necessary.

The assembly is rugged but flexible in such a manner as to be able to absorb accidental shocks. It does not present any sharp angles which might cause injury to the user or which might snag his clothing. There are no lateral projections which might cause a serious accident such as hitting a pedestrian or possible freeing of the ski carriers because these do not have any portions which extend beyond the roof of the automobile.

The handles 91, being of plastic material, prevent disagreeable contact between the hands and metal parts in very low temperatures in the course of stowing and removing the skis.

Finally, the assembly presents an attractive appearance and has curved lines which harmonize with the contours of modern automobiles.

In FIG. 8 there is shown a modification of FIG. 3 and the same members are designated by the same reference numerals, the analogous members being designated by primed reference numerals. This modification is distinguished by the fact that the bolt 51' of the cover 44' instead of locking in the lateral support 23, locks in the bracket 49' in which the axis of the toggle member 47' is pivoted. Additionally, the shape of the cover 44' of the bracket 49' and of the toggle member 47' have been modified with respect to the corresponding members shown in the embodiment of FIG. 3.

While I have shown and described what I believe to be the best embodiments of my invention, it will be apparent to those skilled in the art that various changes and modifications may be made therein without departing from the spirit and scope of the invention as defined in the appended claims.

What is claimed is:

1. A ski carrier for use with an elongated vehicle having a roof and a gutter extending along each side of said roof, each gutter being of generally U-shaped transverse cross-sectional configuration, said carrier comprising: two elongated transverse members which, when said carrier is in use, extend above said roof transversely of the longitudinal axis of said vehicle and in longitudinally spaced relationship; a foot member at each end of each transverse member, each of said foot members comprising two structural elements, one of said elements being engageable in one of said gutters and the other element being connected to one end of the corresponding transverse member; means defining a slot in one of said elements; pin means extending through said slot means interconnecting said two elements while permitting relative limited vertical movement as well as relative pivotal movement of the element in the gutter relative to the other element about an axis perpendicular to said longitudinal axis of the vehicle, said interconnecting means also permitting one of said two elements to be fixedly secured to the other element in any vertically or pivotally adjusted position thereof; means for adjusting the length of each transverse member to bring said one element of said foot members into register with said gutters whereby each foot member may be positioned in one of said gutters; locking means securing each foot member against upward movement out of its respective gutter; and a series of transversely spaced ski carrier members positioned on each of said transverse members, each ski carrier member on one of said transverse members being in axial alignment with a corresponding ski carrier member positioned on the other transverse member.

2. A carrier according to claim 1, further comprising at least one ski pole carrier member on each of said transverse members, the ski pole carrier member on one of said transverse members being in axial alignment with the ski pole carrier member on the other transverse member.

3. A ski and ski pole carrier according to claim 2, wherein each carrier member comprises two upwardly extending arm portions for receiving in the case of a ski carrier member, a pair of skis therebetween and, in the case of a ski pole carrier member, at least one ski pole therebetween, said arm portions of each carrier member having a gap between the upper ends thereof, each transverse member further comprising at least one elongated retaining member and means mounting said retaining member for pivotal movement between a first position in which it bridges the gaps between the arm portions of a plurality of said carrier members and a second position in which it extends generally perpendicularly with respect to said transverse member leaving all of said gaps open.

4. A ski and ski pole carrier according to claim 2, wherein all of said carrier members extend below said transverse members and are formed of pliable resilient material, whereby damage to the finish of said roof is avoided in the event of contact between any of said carrier members and said roof.

5. A ski carrier according to claim 1, wherein each of said locking means comprises a key operable bolt for preventing theft of said carrier.

6. A ski carrier according to claim 1, wherein each of said carrier members comprises an upwardly convexly arched floor portion formed of resilient material for cushioned engagement with said skis.

7. A ski carrier for use with an elongated vehicle having a roof and a gutter extending along each side of said roof, each gutter being of generally U-shaped transverse cross-sectional configuration, said carrier comprising: two elongated transverse members which, when said carrier is in use, extend above said roof transversely of the longitudinal axis of said vehicle and in longitudinally spaced relationship, each of said transverse members comprising a central slide member and two lateral slide members, said slide members being of slidably interfitting cross-sectional configuration, each transverse member further comprising a pair of housings within each of which one of said lateral slide members terminates, each of said central slide members extending slidably through both of said housings; set screw means in each housing positioned for access from the bottom of said housing, said set screw means, when tightened, locking said central slide member against relative movement both with respect to said housing and with respect to the lateral slide member which terminates therein; a foot member connected to the free end of each lateral slide member, said lateral slide members being adjustable, with said set screw means loosened, to bring said foot members into register with said gutters whereby each foot member may be positioned in one of said gutters; locking means securing each foot member against upward movement out of its respective gutter; and a series of transversely spaced ski and ski pole carrier members positioned on said lateral slide members, each ski carrier member on one of said slide members being in axial alignment with a corresponding ski carrier member on another slide member and each ski pole carrier member being in axial alignment with a corresponding ski pole carrier member on another slide member.

8. A ski and ski pole carrier according to claim 7, wherein each of said housings further comprises elongated socket means mounted in said housing for pivotal movement of the longitudinal axis of said socket means about an axis perpendicular to said longitudinal axis of said vehicle, each of said carrier members comprising two upwardly convergently extending arm portions with a gap between the upper ends thereof for receiving, in the case of a ski carrier member, a pair of skis therebetween and, in the case of a ski pole carrier member, at least one ski pole therebetween, each of said housings further comprising an elongated retaining member having one end portion extending into said socket means for pivotal movement about the longitudinal axis thereof, the other end portion of each retaining member being movable between a closed position wherein it is engageable with an upper portion of one of said foot members and wherein it extends intermediate its ends over and closes said gaps of all of the carrier members on one of said lateral slide members and an open position wherein it extends generally parallel to said longitudinal axis of said vehicle; and resilient means in each housing acting on said socket means for yieldingly urging said other end portion of said retaining member upwardly away from said foot member when said retaining member is in said closed position.

9. A ski and ski pole carrier according to claim 8, further comprising manually releasable locking means interconnecting said upper portion of each of said foot members and said other end portion of one of said retaining members for securing each of said retaining members in its closed position.

10. A ski and ski pole carrier according to claim 9, wherein said manually releasable locking means is a key operable bolt for preventing theft of said skis and ski poles.

References Cited

UNITED STATES PATENTS

| | | | |
|---|---|---|---|
| 2,752,079 | 6/1956 | Merrill | 224—42.1 |
| 2,988,253 | 6/1961 | Menghi | 224—42.1 |
| 3,225,987 | 12/1965 | Bonner | 224—45 |

FOREIGN PATENTS

| | | |
|---|---|---|
| 31,712 | 11/1961 | Finland. |
| 1,184,229 | 12/1964 | Germany. |
| 380,557 | 9/1964 | Switzerland. |

GERALD M. FORLENZA, *Primary Examiner.*

F. E. WERNER, *Assistant Examiner.*